United States Patent [19]

Garnett et al.

[11] 4,179,401
[45] Dec. 18, 1979

[54] PREPARATION OF HETEROGENEOUS CATALYSTS INCLUDING THE STEPS OF RADIATION GRAFTING OF AN ALPHA UNSATURATED MONOMER TO A METAL OR TO AN ORGANIC POLYMER

[76] Inventors: John L. Garnett, 29 Arabella St., Longueville, New South Wales; Robert S. Kenyon, 29 Glen St., Eastwood, New South Wales, both of Australia

[21] Appl. No.: 814,772

[22] Filed: Jul. 11, 1977

Related U.S. Application Data

[63] Continuation-in-part of Ser. No. 720,042, Aug. 30, 1976, abandoned, Continuation of Ser. No. 594,081, Jul. 8, 1971, abandoned.

[30] Foreign Application Priority Data

Jul. 10, 1974 [AU] Australia .................... PB8162

[51] Int. Cl.$^2$ .............. B01J 31/28; B01J 31/20; B01J 31/24; G08F 8/00
[52] U.S. Cl. ................ 252/429 R; 204/159.17; 252/430; 252/431 N; 252/431 P; 427/44; 427/399; 427/400; 568/909; 585/277; 585/365; 585/665

[58] Field of Search .......... 252/426, 428, 429 R, 252/430, 431 N, 431 P; 427/35, 44, 399, 400; 204/159.17; 260/877

[56] References Cited

U.S. PATENT DOCUMENTS

| | | | |
|---|---|---|---|
| 3,068,122 | 12/1962 | Cline et al. | 427/35 |
| 3,247,133 | 4/1962 | Chen | 204/159.17 |
| 3,489,699 | 1/1970 | Battaerd et al. | 204/159.17 |
| 3,522,158 | 7/1970 | Garnett et al. | 427/44 |
| 3,755,393 | 8/1973 | Kniese et al. | 260/429 R |
| 3,960,962 | 6/1976 | Shubkin | 252/430 |
| 3,981,775 | 9/1976 | Kenyon et al. | 204/159.17 |

FOREIGN PATENT DOCUMENTS 1117425  6/1968  United Kingdom ............ 252/426

Primary Examiner—P. E. Konopka
Attorney, Agent, or Firm—Michael J. Striker

[57] ABSTRACT

A process for heterogenizing a metal salt or organometallic complex catalyst of the type containing a group VIII metal comprising the steps of radiation grafting a monomer having a α unsaturated bond to a metal or an organic polymer and complexing a nitrogen, halogen or phosphorous containing group to the monomer with the metal salt or organometallic complex. The resultant catalysts being useful in the hydrogenation, hydroformylation, isomerization, cracking or dehydrogenation of organic molecules.

10 Claims, No Drawings

PREPARATION OF HETEROGENEOUS CATALYSTS INCLUDING THE STEPS OF RADIATION GRAFTING OF AN ALPHA UNSATURATED MONOMER TO A METAL OR TO AN ORGANIC POLYMER

The present application is a continuation-in-part application of application Ser. No. 720,042, filed Aug. 30, 1976 and entitled "Heterogeneous Catalyst", now abandoned, which in turn is a continuation application Rule 60 of Ser. No. 594,081 filed July 8, 1971 and now abandoned.

BACKGROUND OF THE INVENTION

The present invention relates to a process for the catalytic restructuring of organic molecules, to a process for the production of such catalysts and to the catalysts per se.

Catalysts are often categorised as being homogeneous or heterogeneous dependent upon whether the catalyst is in the same physical state as the compound or compounds being catalytically reacted. Thus liquid catalysts or catalysts in solution in the reaction medium are said to be homogeneous when the compound or compounds being reacted are in the liquid state. Among the known homogeneous catalysts are the catalytic metal salts and organometallic complexes of metals selected from the group comprising Ruthenium, Rhodium, Palladium, Osmium, Iridium and Platinum. These compounds are known to be active in the hydrogenation, hydroformylation, isomersation, cracking and dehydrogenation of organic molecules.

These known catalysts have suffered from the disadvantage that they are difficult to recover from the reaction medium due to their homogeneity with the reaction medium. As these catalysts are extremely costly to produce even very low levels of losses are economically unacceptable.

Proposals have been made to render known homogeneous catalysts heterogeneous such as by anchoring the catalysts to a solid substrate. The reaction medium could then be caused to flow past the immobilised catalyst. The difficulty with this suggestion is that the methods of anchoring suggested have either rendered the catalysts inactive or the anchoring has been insecure to a degree where an economically unacceptable level of catalyst has leached from the substrate as the reaction medium flows past the immobilised catalyst.

SUMMARY OF THE INVENTION

The present invention is designed to produce heterogeneous catalysts which show acceptable levels of catalytic activity without significant catalyst losses during reaction.

The present invention comprises a process for the production of a heterogenous catalyst for the hydrogenation, hydroformylation, isomerisation, cracking or dehydrogenation of organic molecules comprising the steps of:

(a) irradiating a substrate selected from the group comprising a metal and an organic polymer with ionising radiation in the presence of an α olefin having the formula $$X-R-C=CH_2$$

wherein R is an organic moiety containing a carbon chain of at least 2 carbon atoms or an aromatic group, and wherein X is a nitrogen or halogen containing group capable of coordinating with a metal salt or an organometallic complex, to graft the monomer to the substrate, and (b) reacting the X group of the monomer-substrate conjugate with a catalytic metal salt or a catalytic organometallic complex, which salt or complex contains a metal selected from the group comprising Ruthenium, Rhodium, Palladium, Osmium, Iridium and Platinum, such that the monomer-substrate conjugate becomes a ligand of the metal salt or organometallic complex.

In another aspect the invention consists in a process for the production of a heterogenous catalyst for the hydrogenation, hydroformylation, isomerisation, cracking or dehydrogenation of organic molecules comprising the steps of:

(a) irradiating a substrate selected from the group comprising a metal and an organic polymer with ionising radiation in the presence of an α olefin having the formula $$X-R-C=CH_2$$

wherein R is an organic moiety containing a carbon chain of at least two carbon atoms or an aromatic group, and wherein X is a nitrogen or halogen group capable of being chemically converted to a group capable of coordinating with a metal salt or an organometallic complex, to graft the monomer to the substrate, (b) chemically converting the X group of the monomer-substrate conjugate to a group which is capable of coordinating with the metal salt or organometallic complex and, (c) reacting the X group of the monomer substrate conjugate with a catalytic metal salt or a catalytic organometallic complex which salt or complex contains a metal selected from the group comprising Ruthenium, Rhodium, Palladium, Osmium, Iridium and Platinum such that the monomer-substrate conjugate becomes a ligand of the metal salt or organometallic complex.

In yet another aspect the invention consists in a process for the production of a heterogeneous catalyst for the hydrogenation, hydroformylation, isomerisation, cracking or dehydrogenation of organic molecules comprising the steps of:

(a) irradiating a substrate selected from the group comprising a metal and an organic polymer with ionising radiation in the presence of a monomer having the formula:

$$X-A$$

wherein A is an organic moiety containing an α olefin or an α acetylene group, and wherein X is a phosphorous containing organic moiety capable of coordinating with a metal salt or an organometallic complex, to graft the monomer to the substrate and (b) reacting the X group of the monomer-substrate conjugate with a catalytic metal salt or a catalytic organometallic complex, which salt or complex contains a metal selected from the group comprising Ruthenium, Rhodium, Palladium, Osmium, Iridium and Platinum, such that the monomer-substrate conjugate becomes a ligand of the metal salt or organometallic complex.

In yet another aspect the invention comprises a process for the production of a heterogeneous catalyst for the hydrogenation, hydroformylation, isomerisation, cracking or dehydrogenation of organic molecules comprising the steps of:

(a) irradiating a substrate selected from the group comprising a metal or an organic polymer with ionising radiation in the presence of a monomer having the formula:

X—A wherein A is an organic moiety containing an α olefin or an α acetylene group, and wherein X is phosphorous containing organic moiety capable of being chemically converted to a group capable of coordinating with a metal salt or an organometallic complex, to graft the monomer to the substrate, (b) chemically converting the X group of the monomer-substrate conjugate to a group which is capable of coordinating with the metal salt or organometallic complex and, (c) reacting the X group of the monomer substrate conjugate with a catalytic metal salt or a catalytic organometallic complex which salt or complex contains a metal selected from the group comprising Ruthenium, Rhodium, Palladium, Osmium, Iridium and Platinum such that the monomer-substrate conjugate becomes a ligand of the metal salt or organometallic complex.

In yet another aspect the invention consists in a process for the hydrogenation, hydroformylation, isomerisation, cracking or dehydrogenation of an organic compound the improvement comprising the use, as a catalyst for the reaction, of a compound produced by a process comprising:

(a) irradiating a substrate selected from the group comprising a metal and an organic polymer with ionising radiation in the presence of an α olefin having the formula

X—R—C=CH$_2$ wherein R is an organic moiety containing a carbon chain of at least 2 carbon atoms or an aromatic group, and wherein X is a group capable of coordinating with a metal salt or an organometallic complex, to graft the monomer to the substrate, and (b) reacting the X group of the monomer-substrate conjugate with a catalytic metal salt or a catalytic organometallic complex, which salt or complex contains a metal selected from the group comprising Ruthenium, Rhodium, Palladium, Osmium, Iridium and Platinum, such that the monomer-substrate conjugate becomes a ligand of the metal salt or organometallic complex.

In yet another aspect the invention consists in a process for the hydrogenation, hydroformylation, isomerisation, cracking or dehydrogenation of an organic compound the improvement comprising the use as a catalyst for the reaction of a compound produced by a process comprising:

(a) irradiating a substrate selected from the group comprising a metal and an organic polymer with ionising radiation in the presence of an α olefin having the formula

X—R—C=CH$_2$ wherein R is an organic moiety containing a carbon chain of at least two carbon atoms or an aromatic group, and wherein X is a group capable of being chemically converted to a group capable of coordinating with a metal salt or organometallic complex, to graft the monomer to the substrate, (b) chemically converting the X group of the monomer-substrate conjugate to a group which is so capable of coordinating with the metal salt, and (c) reacting the X group of the monomer substrate conjugate with a catalytic metal salt or a catalytic organometallic complex which salt or complex contains a metal selected from the group comprising Ruthenium, Rhodium, Palladium, Osmium, Iridium, and Platinum such that the monomer-substrate conjugate becomes a ligand of the metal salt or organometallic complex.

In yet another aspect the invention consists in a process for the hydrogenation, hydroformylation, isomerisation, cracking or dehydrogenation of an organic compound the improvement comprising the use as a catalyst for the reaction, of a compound produced by a process comprising:

(a) irradiating a substrate selected from the group comprising a metal and an organic polymer with ionising radiation in the presence of a monomer having the formula:

X—A wherein A is an organic moiety containing an α olefin or an α acetylene group, and wherein X is a phosphorous containing organic moiety capable of coordinating with a metal salt or an organometallic complex, to graft the monomer to the substrate, and (b) reacting the X group of the monomer-substrate conjugate with a catalytic metal salt or a catalytic organometallic complex, which salt or complex contains a metal selected from the group comprising Ruthenium, Rhodium, Palladium, Osmium, Iridium, and Platinum, such that the monomer-substrate conjugate becomes a ligand of the metal salt or organometallic complex.

In yet another aspect the invention consists in a process for the hydrogenation, hydroformylation, isomerisation, cracking or dehydrogenation of an organic compound the improvement comprising the use, as a catalyst for the reaction, of a compound produced by a process comprising:

(a) irradiating a substrate selected from the group comprising a metal or an organic polymer with ionising radiation in the presence of a monomer having the formula:

X—A wherein A is an organic moiety containing an α olefin or an α acetylene group, and wherein X is phosphorous containing organic moiety capable of being chemically converted to a group capable of coordinating with a metal salt or an organometallic complex, to graft the monomer to the substrate, (b) chemically converting the X group of the monomer substrate conjugate to a group which is capable of coordinating with the metal salt or organometallic complex, and (c) reacting the X group of the monomer substrate conjugate with a catalytic metal salt or a catalytic organometallic complex which salt or complex contains a metal selected from the group comprising Ruthenium, Rhodium, Palladium, Osmium, Iridium and Platinum such that the monomer-substrate conjugate becomes a ligand of the metal salt or organometallic complex.

DETAILED DESCRIPTION OF THE PREFERRED EMBODIMENTS

The catalysts according to the present invention show catalytic activity in one or more of the following reactions:
- hydrogenation,
- hydroformylation,
- isomerisation,
- cracking and
- dehydrogenation These reactions are well known but may be exemplified in the following manner. Hydrogenation occurs when hydrogen atoms are added to an unsaturated organic molecule e.g. when cyclohexene is reduced to cyclohexane. An example of hydroformylation is the addition of hydrogen and carbon monoxide to propylene to form butanol. Isomerisation is a process of structural rearrangement such as the conversion of an α olefin to a β olefin. Cracking occurs when an organic molecule is broken to yield two stable smaller molecules such as the cracking of butane to form ethane and methane. Dehydrogenation is the removal of hydrogen to give rise to unsaturated bonds in an organic molecule.

The ionising radiation used to carry out the grafting step of the process according to this invention may comprise ionising ultra-violet radiation, β-rays, γ-rays, electron beams or radiation from other conventional radiation sources including mixtures of any of the foregoing forms of ionising radiation. The total dose and dose rate may be varied to vary the graft obtained. Routine experimentation taken together with the specific examples provided hereinafter will allow persons skilled in the art to determine the optimum grafting conditions for any particular monomer/substrate combinations. It has been found that the addition of acid to monomer solutions may give rise to an increase in graft for a given total dose. The acid enhancement effect is significant since it may be used to obtain high grafts at low radiation doses.

The substrate may either be a metal such as iron, copper or aluminium or a natural or synthetic organic polymer.

If a metal substrate is used it has been found that the monomer can be effectively attached to the metal although the exact chemical nature of the bond is not clear. There may be a large element of mechanical bonding though the formation of covalent bonding is considered possible. This form of metal/monomer attachment is herein included within the expression "graft". The polymers which may be used in the present invention includes natural carbohydrate polymers such as polysacharides and cellulose; protein polymers such as leather; and wool.

Synthetic polymers including polyolefine, polyvinyl compounds including aromatic polyvinyl compounds, polyvinylidenes, polysiloxanes, polydienes, polyethers, polyimides, polysulphones, polyesters, polyamides, polyurethanes, polycarbonates, polyimides and polyureas may be used as substrates.

Suitable polyolefines are e.g. low and high density polyethlenes, polypropylene, polybutane, poly-4-methylpentane (−1) and copolymers of alpha olefines with each other or with substituted vinyl and/or vinylidene monomers, e.g. vinyl esters, vinyl ethers or vinyl aromatic compounds. The polyolefines may also be totally substitued with halogens, e.g. polytetrafluoroethylene or poly (monochlorotrifluoroethylene.

Suitable vinyl and vinylidene polymers are, for example, polyvinyl chloride, polyvinyl fluoride, polyvinylidene chloride polystyrene, and substituted polystyrenes, polyacrylates, polymethacrylates, polyacrylamides and copolymers of the corresponding monomers. Particularly suitable for the formation of substrates are polyethylene and polypropylene.

The structure of the monomers usable in carrying out the present invention depends at least in part upon the nature of the group which will coordinate with the catalytic metal salt or organometallic complex. The group must contain a nitrogen, halogen or phosphorous atom and the atom must either be in a valency state where it is free to coordinate with the metal salt or organometallic complex, or alternatively must be capable of being chemically converted to such a a valency state. This valency state will normally be a state in which the atom has available a lone pair of electrons available to form the coordination bond. It should be noted that in some cases, such as that of $NO_2$ groups, lone electron pairs are formed only at high temperatures and it is therefore only possible to form the coordination bonds at such temperatures although the complexes so formed are stable at room temperature.

If the coordination group contains a nitrogen or halogen atom then the monomer should have the following formula:

$$X-R-C=CH_2$$

wherein R is an organic moiety containing a carbon chain of at least two carbon atoms or an aromatic group, and wherein X is the nitrogen or halogen containing group.

It is believed that the two carbon chain or the aromatic group is essential to project the nitrogen or halogen atom from the polymer sufficiently to enable the coordination of the monomer/polymer conjugate with the metal salt or organometallic complex. The preferred monomers or these in which the nitrogen or halogen containing group is in the para-position on a benzene ring. The most suitable monomers in this class known to the applicant are p-nitrostyrene, p-amino styrene and p-chlorostyrene.

If p-nitrostyrene is grafted onto the substrate it is desirable to reduce the nitro group to an amino group as the nitro group does not readily coordinate with the metal salt or organometallic complex itself whereas the amino group does.

If p-nitrostyrene is used it may be caused to form a grignard reagent which will readily coordinate with the metal salt or organometallic complex. While the chloro substituent is preferably among the halogens other halogen atoms may be used particularly bromo derivatives.

If the coordination group contains a phosphorous atom the monomer should have the formula:

$$X-A$$

wherein A is an organic moiety containing an α olefin or an α acetylene group and wherein X is the phosphorous containing organic moiety. The ability of phosphorous containing groups to coordinate with the metal salts or organometallic complexes is such that it is not essential that there be a two carbon chain between the phosphorous containing group and the α olefin or α acetylene group. It should also be noted that α acetylene, phosphorous containing compounds have been found to be capable of grafting to the substrates useful in this invention whereas similar nitrogen and halogen containing compounds have proven unsatisfactory.

The preferred phosphorous containing monomers include:

vinyldiphenylphosphine
cis-bis (1,2-diphenylphosphino) ethylene
trans-bis (1,2-diphenylphosphino) ethylene
bis (diphenylphosphino) acetylene
triallylphosphine
divinylphenylphosphine As will be seen from the following detailed examples the solvent in which the grafting reaction is carried out can affect the graft yield and the actual formation of the complex on the surface of the polymer. Dioxan was found to be the most suitable solvent with the phosphorous monomers used by the present applicants.

It will also be noted that certain homogenous complexes e.g. chlorotris (triphenylphosphine) rhodium (I) are readily heterogenised with the vinyldiphenylphosphine copolymer but not with the corresponding cis-bis (1,2-diphenylphosphino) ethylene copolymer. The reverse occurs with other complexes e.g. hydridocarbonyltris (triphenylphosphine) rhodium (I). It is therefore necessary to routinely test a variety of monomer/polymer conjugates with any given metal salt or organo metallic complex in order to optimise the degree of heterogenisation of the homogeneous catalyst.

In the selection of the most efficaceous monomer for the formation of the monomer/substrate conjugate it is desirable that the monomer contains at least one aromatic ring. It is also desirable that the length of the monomer unit not be too long as increasing length of the carbon chain within the monomer can give rise to reductions in graft and/or reductions in the degree of heterogenisation of the catalyst. Similarly it must be recognised that during grafting of the monomer to the substrate some homopolymerisation will take place to form dimers, trimers etc. which are then grafted to the polymer. This homopolymerisation is found to be maximised under conditions which correspond to an observable Trommsdorff peak. It has been found that if the monomer is grafted under conditions which favour homopolymerisation of the monomer prior to graft, the functional group for attachment of the catalyst may be well removed from the surface of the polymer and thus steric effects which hinder insolubilisation of the catalyst are minimised. However, if the chain length is too long adverse entropy effects may retard the immobilisation process, thus some compromise in chain length of graft before the conditions of the Trommsdorff peak are reached may be ideal.

A preferred example of the process according to the present invention is hereinafter given.

(a) Grafting of monomer

In a typical grafting experiment 5 g of a substrate such as polypropylene or polyvinyl chloride powder was irradiated in air in a cobalt 60 source, as a suspension in 6 ml. of an approximate 30% V/V solution of a monomer such as p-nitro styrene in a solvent such as N,N-dimethylformamide or methanol. Homopolymer was removed by succesive washing in the solvent. The reaction were carried out at ambient temperature and pressure. Table 1 and 2 hereunder shows the grafting obtained under various reaction conditions.

TABLE 1

| Total Dose (Mrad) | pp[b] | Soluble[c] PVC | Insoluble[d] PVC |
|---|---|---|---|
| 0.5 | 11.9 | | |
| 1.0 | 17.5 | 6.0 | 8.3 |
| 1.5 | 24.0 | | |
| 2.0 | 30.2 | 8.2 | 11.7 |
| 3.0 | | 8.9 | 11.9 |
| 4.0 | | 9.1 | 18.8 |

Graft (%)[a]

[a] % by weight calculated from elemental composition.
[b] Polypropylene powder without stabilizer (5g) suspended in 33% p-nitrostyrene in N,N dimethylformamide (6ml), irradiated at 200 kRad h$^{-1}$ in air (cobalt-60)
[c] Polyvinylchloride (1g) dissolved in 30% p-nitrostyrene in N,N dimethylformamide (5ml), irradiated as in [b].
[d] Polyvinylchloride (1g) suspended in 33% p-nitrostyrene in methanol (5ml), irradiated as in [b].

TABLE 2

| Trunk Polymer[a] | Graft (%)[e] |
|---|---|
| Polypropylene (PP1)[b] | 30.2 |
| Polypropylene (PP2) | 5 |
| Low density polyethylene (LDPE) | 4 |
| High density polyethylene (HDPE) | 3 |
| Polyvinylchloride (PVC1) | 8 |
| Polyvinylchloride (PVC2)[c] | 13 |
| Polyvinylchloride (PVC3)[d] | 15 |
| Poly(styrene-g-polypropylene) PS | 4 |

[a] Trunk polymer (5g) suspended in monomer solution (30%) in N,N dimethyl formamide (6ml) and irradiated in air at 200 kRad h$^{-1}$ to a total dm of 3 MRad.
[b] Polypropylene without stabiliser.
[c] 50% p-nitrostyrene in N,N dimethyl formamide (trunk polymer soluble).
[d] 30% p-nitrostyrene in methanol (trunk polymer insoluble).
[e] Calculated from elemental analysis.

The following Table 3 exemplifies the preparation of phospine copolymers for use in the present invention:

| Sample | Grafting Mixture[a] | Wt (g) | Wt Recovered (g) | Graft (%) |
|---|---|---|---|---|
| 1. | Vinylidiphenylphosphine | 5 | | 13.4 |
| | Polypropylene | 15.000 | 17.005 | |
| | Dioxan | 40 | | |
| 2. | cis-Bis(1,2-diphenyl-phosphino) ethylene | 1.2 n | | 8.1 |
| | Polypropylene | 5.000 | 5.403 | |
| | Dioxan | 15 | | |
| 3. | Trans-Bis (1,2-diphenylphosphino) ethylene | 1 | | 2.4 |
| | Polypropylene | 4.000 | | |
| | Dioxan | 15 | | |
| 4. | Bis(diphenylphosphino) acetylene | 1.05 | | 1.6 |
| | Polypropylene | 4.000 | 4.06 | |
| | Dioxan | 15 | | |
| 5. | Triallylphosphine | 1 | | 2.3 |
| | Polypropylene | 4.000 | 4.09 | |
| | Dioxan | 15 | | |
| 6. | Divinylphenylphosphine | 1 | | 3.9 |
| | Polypropylene | 4.000 | 4.157 | |
| | Dioxan | 15 | | |

[a] Radiation dose 2 MRad at a dose rate of 400 kRad h$^{-1}$ in cobalt-60 source.
[b] Reduction of nitro group.

The nitro group of the radiation copolymer was reduced to the corresponding amino group by the following reaction.

The radiation copolymer (5 g) suspended in N,N dimethylformamide (6 ml.) was heated to 100° C. with stirring and a solution of stannous chloride (10 g.) in N,N dimethylformamide (25 ml.) was added. After 6 hours hydrochloric acid (10 M, 10 ml.) was run in and the mixture stirred at 100° C. for a further 12 hours. The cooled mixture was filtered and the copolymer washed alternatively with N,N dimethylformamide (5 ml.) and hydrochloric acid (6 M).

(c) Binding of homogeneous catalyst.

Typically an aliquot (0.4 g.) of the copolymer was warmed to between 60° C. and 65° C. with a saturated solution of the homogeneous catalyst in an appropriate solvent. The temperature was selected to be sufficiently high to allow the reaction to take place in from 20 minutes to 2 hours without causing dissociation of the complex.

The following table gives details of the heterogenising of various homogeneous catalysts by the process described in the foregoing paragraph and additionally gives details of the activity of the complex so formed in the hydrogenation of cyclohexene.

to give a total dose of 0.5 MR. A 50% w/w graft of monomer to polymer was observed.

The copolymer was reacted with magnesium in either to produce the corresponding Grignard reagent at the site of the active chloride atoms of the copolymer. The Grignard reagent was then reacted with rhodium (tris triphenylphosphine) (carbonyl) chloride in tetrahydrofuran.

The hydrogenation activity of the catalysts produced by the process according to the present invention may be composed in the following way:

The heterogenised catalyst (0.1 g) was shaken with cyclohexene (0.2 ml) in toluene in a tube (700 ml.). The samples were reacted with hydrogen (700 torr) under the conditions shown in the following tables:

TABLE 5

| Catalyst | % v/v Hydrogenation | Tube | Temp. °C. |
|---|---|---|---|
| p-$NO_2$ styrene/polypropylene + $RhCl_3$ | 0 | 1 | 50 |
| " | 0 | 2 | 120 |
| " | 17.8% | 3 | 150 |
| p-$NH_2$ styrene/polypropylene + $RhCl_3$ | 28.6 | 4 | 50 |
| " | 27.8 | 5 | 120 |
| " | 6.4 | 6 | 150 |
| p-$NO_2$ styrene/polypropylene + Rh H(CO) $(Pph_3)_3$ | 0 | 7 | 50 |
| " | 0.1 | 8 | 120 |
| " | 41.5 | 9 | 150 |
| p-$NH_2$ styrene/polypropylene + RLH(CO) $(Pph_3)_3$ | 24.6 | 10 | 50 |
| " | 24.0 | 11 | 120 |
| " | 29.5 | 12 | 150 |
| p-$NO_2$ styrene/polypropylene Blank | 0 | 13 | 150 |
| p-$NH_2$ styrene/polypropylene Blank | 0 | 14 | 150 |
| p-Cl styrene/polypropylene graft Rh$(Pph_3)_2$ (CO)Cl | 10.3 | 15 | 50 |
| " | 27.6 | 16 | 120 |
| " | 27.6 | 17 | 150 |

TABLE 4

| Run | Support | Catalyst | Solvent for Heterogenation | Metal[b] on Surface (%) | Conversion of Cyclohexene (%) |
|---|---|---|---|---|---|
| 1 | 1 | Chlorotris (triphenylphosphine) rhodium (I) | toluene | 0.26 | 31 |
| 2 | 1 | Bromotris (triphenylphosphine) rhodium (I) | dioxan | 0.01 | 0 |
| 3 | 1 | Hydridocarbonyltris (trisphenylphosphine) rhodium (I) | dioxan | 0.008 | 0 |
| 4 | 1 | Rhodium trichloride | water | 0.26 | 79 |
| 5 | 1 | Sodium hexachlororhodate | water | 0.27 | 5 |
| 6 | 1 | Dichlorobis (triphenylphosphine) palladium (II) | dioxan | 0.17 | 41 |
| 7 | 2 | Chlorotris (triphenylphosphine) rhodium (I) | dioxan | <0.008 | 0 |
| 8 | 2 | Rhodium trichloride | DMSO | <0.008 | 0 |
| 9 | 2 | Chlorocarbonyltris (triphenylphosphine) iridium | dioxan | <0.05 | 0 |
| 10 | 2 | Hydridocarbonyltristriphenylphosphine) rhodium (I) | dioxan | 0.025 | 75 |
| 11 | 2 | Rhodium trichloride | ethanol/water (4:1 v/v) | 2.0 | 100 |

[a]Series 1 i.e. sample 1 in Table 3, hydrogenation with cyclohexene for 140 hours at 130° C. Series 2 i.e. sample 2 in Table 3, hydrogenation with cyclohexene for 160 hours at 130° C.
[b]Analysis by emission spectrograph.

In another method for the preparation of a catalyst according to this invention a 30% solution of p-chloro styrene in methanol was added to a polypropylene powder and irradiated with γ-rays at a rate of 200,000 R/hr

TABLE 6

| Heterogenized Complex[a] | Metal on Surface (%) | Temp. (°C.)[b] | Hydrogenation[c] |
|---|---|---|---|
| p-NST/PP/$RhCl_3$ | 0.01 | 50 | 0 |
| p-NST/PP/$RhCl_3$ | 0.1 | 120 | 0 |
| p-NST/PP/$RhCl_3$ | 0.01 | 150 | 62 |
| p-AST/PP/$RhCl_3$ | 0.43 | 50 | 100 |
| p-AST/PP/$RhCl_3$ | 0.43 | 120 | 100 |
| p-NST/PP/RhH (CO) $(Ph_3P)_3$ | 0.04 | 50 | 0 |
| p-NST/PP/RhH (CO) $(Ph_3P)_3$ | 0.04 | 120 | 0 |
| p-NST/PP/RhH (CO) $(Ph_3P)_3$ | 0.04 | 150 | 100 |
| p-AST/PP/RhH (CO) $(Ph_3P)_3$ | 0.12 | 50 | 100 |
| p-AST/PP/RhH (CO) $(Ph_3P)_3$ | 0.12 | 120 | 100 |
| p-AST/PP/RhH (CO) $(Ph_3P)_3$ | 0.12 | 150 | 100 |
| p-CST/PP/RhCl (CO) $(Ph_3P)_2$ | | 50 | 36 |
| p-CST/PP/RhCl (CO) $(Ph_3P)_2$ | | 120 | 100 |
| p-CST/PP/RhCl (CO) $(Ph_3P)_2$ | | 150 | 100 |
| p-NST/PP | | 150 | 0 |
| p-AST/PP | | 150 | 0 |

[a]p-NST = nitrostyrene; p-AST = p-aminostyrene; p-CST = p-chlorostyrene; PP = polypropylene.
[b]Hydrogenation temperature (4 days)
[c]% approach to equilibrium.

The corresponding acitivity of the present catalysts may be compared by similar testing using the hydroformylation isomerisation, cracking and dehydrogenation reaction described earlier in this specification.

We claim:

1. A process for the production of a heterogeneous catalyst which is a member selected from the group consisting of hydrogenation-, hydroformylation-, isomerisation-, cracking- and dehydrogenation-catalysts for organic molecules comprising the steps of:
    (a) irradiating a substrate selected from the group consisting of a metal and an organic polymer with ionizing radiation in the presence of an α olefin monomer having the formula:

$$X-R-C=CH_2$$

wherein R is a member selected from the group consisting of organic moieties containing a carbon chain of at least two carbon atoms and organic moieties containing an aromatic group, and wherein X is a member selected from the group consisting of nitrogen-containing and halogen-containing groups, the nitrogen- and halogen-containing groups being capable of being chemically converted to a group capable of coordinating with a member of the group consisting of metal salts and organometallic complexes so as to graft the monomer to the substrate to produce a monomer-substrate conjugate;
- (b) chemically converting the X group of the monomer-substrate conjugate to a group which is capable of coordinating with a member selected from the group consisting of the metal salts and the organometallic complexes; and,
- (c) reacting the X group of the monomer-substrate conjugate with a member selected from the group consisting of catalytic metal salts and catalytic organometallic complexes, which salts and complexes contain a metal selected from the group consisting of Ruthenium, Rhodium, Palladium, Osmium, Iridium and Platinum so as to transform the monomer-substrate conjugate into a ligand of the selected member of the group consisting of the catalytic metal salts and the catalytic organometallic complexes.

2. A process as claimed in claim 1, wherein the substrate is selected from the group of metals consisting of iron, copper and aluminum.

3. A process as claimed in claim 1, wherein the substrate is selected from the group of polymers consisting of polystyrene, polyethylene, polypropylene and cellulose.

4. A process as claimed in claim 1, wherein the monomer is selected from the group consisting of p-nitro styrene, a nitro phenylacrylate and p-chloro styrene.

5. A process as claimed in claim 1, wherein the ionizing radiation is selected from the group consisting of ionizing U. V. radiation, $\beta$-rays, $\gamma$-rays, accelerated sub-atomic particles and x-rays.

6. A process for the production of a heterogeneous catalyst which is a member selected from the group consisting of hydrogenation-, hydroformylation-, isomerisation-, cracking- and dehydrogenation-catalysts for organic molecules comprising the steps of:
- (a) irradiating a substrate selected from the group consisting of a metal or an organic polymer with ionizing radiation in the presence of a monomer having the formula:

$$X-A$$

wherein A is a member selected from the group consisting of organic moieties containing an $\alpha$ olefin monomer group and organic moieties containing an $\alpha$ acetylene monomer group, and wherein X is a phosphorus-containing organic moiety capable of being chemically converted to a group capable of coordinating with a member selected from the group consisting of metal salts and organometallic complexes, so as to graft the monomer to the substrate to produce a monomer-substrate conjugate;
- (b) chemically converting the X group of the monomer-substrate conjugate to a group which is capable of coordinating with a selected member of the group of the metal salts and organometallic complex and,
- (c) reacting the X group of the monomer substrate conjugate with a member of the group consisting of catalytic metal salts and catalytic organometallic complexes which salts and complexes contain a metal selected from the group consisting of Ruthenium, Rhodium, Palladium, Osmium, Iridium and Platinum such that the monomer-substrate conjugate becomes a ligand of the selected member of the group consisting of the catalytic metal salts and catalytic organometallic complexes.

7. A process as claimed in claim 6, wherein the substrate is selected from the group of metals consisting of iron, copper and aluminium.

8. A process as claimed in claim 6, wherein the substrate is selected from the group of polymers consisting of polystyrene, polyethylene, polypropylene and cellulose.

9. A process as claimed in claim 6, wherein the monomer is selected from the group consisting of p-nitro styrene, a nitro phenylacrylate and p-chloro styrene.

10. A process as claimed in claim 6, wherein the ionizing radiation is selected from the group consisting of ionizing U.V. radiation, $\beta$-rays, $\gamma$-rays, accelerated sub-atomic atomic particles and x-rays.

* * * * *